United States Patent
Tsai et al.

(10) Patent No.: US 7,612,148 B2
(45) Date of Patent: Nov. 3, 2009

(54) HYDROGENATION CATALYST COMPOSITION AND METHOD FOR HYDROGENATION OF CONJUGATED DIENE POLYMER

(75) Inventors: Chin-Kuang Tsai, Kaohsiung (TW); Chien-Cheng Chen, Kaohsiung (TW); Jung-Sheng Pan, Kaohsiung (TW)

(73) Assignee: TSRC Corporation, Taipei (TW)

( * ) Notice: Subject to any disclaimer, the term of this patent is extended or adjusted under 35 U.S.C. 154(b) by 0 days.

(21) Appl. No.: 12/002,812

(22) Filed: Dec. 19, 2007

(65) Prior Publication Data

US 2008/0146733 A1 Jun. 19, 2008

(30) Foreign Application Priority Data

Dec. 19, 2006 (CN) .................. 2006 1 0167606

(51) Int. Cl.
*C08F 8/42* (2006.01)
*C08F 8/20* (2006.01)

(52) U.S. Cl. .............. 525/338; 525/357; 525/332.8; 525/332.9; 525/333.1; 525/333.2; 525/331.7

(58) Field of Classification Search .......... 525/338, 525/339, 332.8, 332.9, 333.1, 333.2, 331.7, 525/357
See application file for complete search history.

(56) References Cited

U.S. PATENT DOCUMENTS

| | | | |
|---|---|---|---|
| 4,980,421 A * | 12/1990 | Teramoto et al. | ............. 525/338 |
| 5,244,980 A | 9/1993 | Gibler et al. | |
| 5,270,274 A | 12/1993 | Hashiguchi et al. | |
| 5,280,058 A * | 1/1994 | Chamberlain et al. | ....... 524/147 |
| 5,886,108 A | 3/1999 | Miyamoto et al. | |
| 5,948,869 A | 9/1999 | Vallieri et al. | |
| 5,985,995 A | 11/1999 | Calle et al. | |
| 6,313,230 B1 | 11/2001 | Tsai et al. | |

FOREIGN PATENT DOCUMENTS

| EP | 0 434 469 A2 | 6/1991 |
|---|---|---|
| EP | 0 544 304 A1 | 6/1993 |

* cited by examiner

*Primary Examiner*—Ling-Siu Choi
(74) *Attorney, Agent, or Firm*—Porzio, Bromberg & Newman, P.C.

(57) ABSTRACT

A method for hydrogenation of a conjugated diene polymer is provided. The conjugated diene polymer in an inert organic solvent is brought into contact with hydrogen in the presence of a hydrogenation catalyst composition to selectively hydrogenate the unsaturated double bonds in the conjugated diene units of the conjugated diene polymer. The hydrogenation catalyst composition includes: (a) a titanium compound; (b) a compound represented by formula (II) or formula (III):

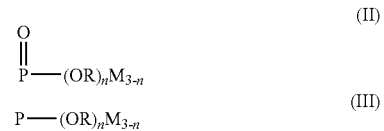

wherein R is $C_1$-$C_{12}$ alkyl, $C_3$-$C_{12}$ cycloalkyl, aryl or alkyl aryl, M is $C_1$-$C_{12}$ alkyl, $C_1$-$C_{12}$ alkoxy, aryl, alkyl aryl, phenoxy or hydroxyl, and n=1~3; and (c) a alkylaluminum compound.

25 Claims, 2 Drawing Sheets

HYDROGENATION CATALYST COMPOSITION AND METHOD FOR HYDROGENATION OF CONJUGATED DIENE POLYMER

FIELD OF THE INVENTION

The present invention relates to a method for hydrogenating a conjugated diene polymer, and more particularly to a method for hydrogenating a conjugated diene polymer with the use of a special catalyst composition and the special catalyst composition thereof.

BACKGROUND OF THE INVENTION

Generally, polymers obtained by polymerizing or copolymerizing conjugated dienes are widely utilized for commercial purposes. These polymers have residual unsaturated double bonds in their polymer chains. These unsaturated double bonds are advantageously utilized for vulcanization and yet have a disadvantage in that they lack the stability to resist weather conditions, oxidation and ozone due to the presence of a large amount of unsaturated double bonds. Such a disadvantage is more severe for copolymers of conjugated dienes and vinyl aromatic hydrocarbons used as thermoplastic elastomers. Such a disadvantage is even more severe when the copolymers of conjugated dienes and vinyl aromatic hydrocarbons are used as modifiers and transparent impact-resistant materials for styrenic resins and olefinic resins. In the field of exterior materials to which such properties are indispensable, the copolymers find limited utility because of this drawback.

This deficiency in stability could be notably improved by hydrogenating such conjugated diene polymers and consequently eliminating the unsaturated double bonds persisting in the polymer chain thereof. Numerous methods have been so far proposed for hydrogenating conjugated diene polymers in the presence of suitable and effective hydrogenation catalysts. Typical hydrogenation catalysts could be classified into two types:

(1) heterogeneous catalysts having compounds of nickel, platinum, or palladium deposited on supports such as active carbon, silica, alumina, or calcium carbonate.

(2) homogenous catalysts, for example, Ziegler-type catalysts obtained by causing an organic acid salt of nickel, cobalt, iron, or chromium to react with a reducing agent such as an organic aluminum compound, and organometallic compounds such as Ru, Rh, Ti, or La compound.

Although widely used in industry, heterogeneous catalysts have lower activity than the homogeneous catalyst. Therefore, a large amount of heterogeneous catalyst is required and the hydrogenation must be conducted at higher temperature and pressure. In contrast, less homogeneous catalyst is needed and the hydrogenation could be conducted at mild temperature and pressure.

Hydrogenation using a heterogeneous catalyst is described as follows. First, the polymer to be hydrogenated is dissolved in a suitable solvent. Then, the polymer is brought into contact with hydrogen in the presence of a heterogeneous catalyst. When the polymer is hydrogenated, contact between the polymer and the catalyst is difficult because of the influence of the viscosity of the reaction system and the influence of stereohindrance of the polymer. Moreover, the hydrogenation requires higher temperature and pressure, and hence, decomposition of the polymer and the gelation of the reaction system tend to occur. Also, in the hydrogenation of a copolymer of a conjugated diene with a vinyl aromatic hydrocarbon, even hydrogenation of the aromatic ring portion takes place due to high temperature and pressure, and it has been difficult to selectively hydrogenate only the double bonds in the conjugated diene portion. In addition, since the polymer is strongly adsorbed on the heterogeneous catalyst, it is impossible to completely remove the catalyst from the hydrogenated polymer solution.

On the other hand, with the homogeneous catalyst, the hydrogenation proceeds normally in a homogeneous system. Therefore, compared with the heterogeneous catalyst, the homogeneous catalyst is generally high in activity and a small amount of catalyst enables a satisfactory hydrogenation to be effected at low temperature and low pressure. In addition, when appropriate hydrogenation conditions are selected, it is possible to preferentially hydrogenate the conjugated diene portion of a copolymer of a conjugated diene with a vinyl aromatic hydrocarbon, while not hydrogenating the aromatic ring portion. Nevertheless, the catalyst could not be removed from the product easily since the amount of the catalyst used in the homogeneous system is higher (which needs a higher concentration of the catalyst), thereby making the product instable and exhausting the energy for removing the catalyst.

Conventional processes for hydrogenation of a conjugated diene polymer using a homogeneous catalyst are summarized below.

U.S. Pat. No. 4,980,421 discloses a process for selectively hydrogenating a conjugated diene polymer using a hydrogenation catalyst including a bis(cyclopentadienyl)titanium(+4) compound, an alkoxy lithium compound, and an organometallic compound (such as aluminum, zinc, or magnesium compound). This hydrogenation catalyst has high activity and could be used under mild conditions.

U.S. Pat. No. 5,270,274 discloses a hydrogenation catalyst composition including a bis(cyclopentadienyl)titanium(+4) compound, a polarized carbonyl group or epoxy group-containing compound, and an organic lithium compound. The unsaturated double bonds in the conjugated diene polymer could be preferentially hydrogenated. The hydrogenated polymer has superior physical properties and weather resistance.

U.S. Pat. No. 5,244,980 discloses a hydrogenation process including terminating a living conjugated diene polymer with hydrogen and then adding an organo alkali metal and a Tebbe's catalyst, which has good hydrogenation efficiency is disclosed therein.

U.S. Pat. No. 5,886,108 discloses hydrogenating a living conjugated diene polymer using a Tebbe's catalyst prepared by the reaction of a bis(cyclopentadienyl)titanium(+4) compound and trimethyl aluminum. This patent discloses that the hydrogenation efficiency is good when the mentioned compound is included in the reaction.

U.S. Pat. No. 5,985,995 discloses a process for producing a hydrogenated rubber, which allows an easy and effective deactivation of the living polymer before the hydrogenation step. The deactivation of living polymer is carried out using alkyl silicon halide or alkyl tin halide. The catalyst used in the hydrogenation of the deactivated polymer could be bis(cyclopentadienyl)Ti(PhOCH3)2. This patent discloses that the reaction reacted with the mentioned catalyst composition has very good hydrogenation efficiency.

U.S. Pat. No. 5,948,869 discloses a catalyst composition effective in the selective hydrogenation of conjugated diene polymer, which includes a bis(cyclopentadienyl)titanium(+4) compound, an alkyl zinc or alkyl magnesium, and a modifier of ethers or aromatic hydrocarbon compounds. This patent discloses that the mentioned catalyst composition increases the hydrogenation efficiency obviously.

European Patent Appl. No. 0434469 A2 discloses a catalyst composition for hydrogenating a conjugated diene polymer, which includes a bis(cyclopentadienyl)titanium compound, an organoaluminum compound or organomagesium compound, and a polar compound of ether or ketone. The catalyst system has capacities of hydrogenating a conjugated diene polymer and the copolymer thereof.

European Patent Appl. No. 0544304A discloses a catalyst composition including a bis(cyclopentadienyl)transition metal compound, a polarized compound of carbonyl group-containing compound or epoxy group-containing compound, an organic lithium compound, and a reducing organometal compound such as aluminum compound, zinc compound, or magnesium compound, for example, triethyl aluminum. This patent discloses that the mentioned catalyst composition increases the hydrogenation efficiency obviously.

U.S. Pat. No. 6,313,230 discloses a catalyst composition effective in the selective hydrogenation of conjugated diene polymer, which includes a bis(cyclopentadienyl)titanium(+4) compound and a Si—H functional group compound, and which could further improve the hydrogenation efficiency.

According to the above descriptions, although many catalyst compositions had been used for hydrogenating a polymer having a conjugated diene, the present invention further provides a stable and easy-to-store catalyst composition and a method for hydrogenating a polymer having a conjugated diene. The polymer could be hydrogenated successfully using a small amount of the catalyst composition with a relatively high activity at a higher temperature. Therefore, the catalyst composition of the present invention is suitable for mass production and greatly enhances economical efficiency.

For overcoming the mentioned disadvantages of the prior arts, a catalyst composition and a method for hydrogenating a polymer having a conjugated diene are provided in the present invention.

SUMMARY OF THIS INVENTION

The main aspect of the present invention is to provide a catalyst composition and a method for successful hydrogenation of a conjugated diene polymer using a small amount of a hydrogenation catalyst composition with relatively high activity. Since the catalyst concentration is very low, there is no need to remove the catalyst from the hydrogenated polymer, which greatly enhances economical efficiency. Moreover, the hydrogenation of the present invention is very rapid and exhibits good reproducibility over a wide range of temperatures and pressures.

As the above, the present invention is to provide a stable and easy-to-store catalyst composition and a method for hydrogenating a polymer having a conjugated diene.

In accordance with a first aspect of the present invention, a catalyst composition for hydrogenating a polymer having a conjugated diene includes:

(a) a first composition having one of a titanium compound of a formula (I):

(I)

wherein
$R^1$ and $R^2$ are identical or different and are ones selected from the group consisting of hydrogen, halogen, $C_1$~$C_8$ alkyl, $C_1$~$C_8$ alkoxy, $C_6$~$C_{12}$ cycloalkyl, phenyl, phenoxy, $C_7$~$C_{10}$ arylalkoxy, $C_7$~$C_{10}$ arylalkyl, carboxy, —$CH_2$P(phenyl)$_2$, —$CH_2$Si($C_1$~$C_5$ alkyl)$_3$ and —P(phenyl)$_2$; and Cp* is one selected from the group consisting of cyclopentadienyl, fluorenyl, indenyl and derivatives thereof.

(b) a second composition having one selected from the group consisting of a first compound of a formula (II), a second compound of a formula (III):

(II)

(III)

wherein the R is one selected from the group consisting of $C_1$~$C_{12}$ alkyl, $C_3$~$C_{12}$ cycloalkyl, aryl, and alkyl aryl, the M is one selected from the group consisting of $C_1$~$C_{12}$ alkyl, $C_1$~$C_{12}$ alkoxy, aryl, alkyl aryl, phenoxy and hydroxyl and n=1 to 3.

(c) a third alkylaluminum compound of a formula (IV):

(IV)

wherein $R^4$, $R^5$ and $R^6$ are identical or different and are ones selected from the group consisting of $C_1$~$C_{12}$ alkyl, $C_6$~$C_{12}$ aryl, hydrogen and halogen.

Preferably, a molar ratio of the second composition to the first position is from 0.1 to 50.

Preferably, a molar ratio of the third composition to the first composition is from 0.1 to 50.

The catalyst composition of the present invention is a stable and easy-to-store catalyst composition. Especially, a composition as the second catalyst of the formula (II) or the formula (□) could be combined with the first composition and the third composition to increase the overall hydrogenation efficiency and stabilize the activity of other catalyst. Therefore, when the catalyst composition of the present invention is added to the conjugated diene polymer, it could be stored for a long period of time and maintains good catalytic activity stability and reproducibility.

In accordance with a second aspect of the present invention, a method for hydrogenating a polymer having a conjugated diene is provided. The method includes a step of hydrogenation of dissloving the polymer in an inert organic solvent or an inert organic solvent which includes a portion of ether and amine polar compound to be reacted with a hydrogen in a presence of a hydrogenation catalyst composition so as to selectively hydrogenate an unsaturated double bond in the polymer.

Preferably, the polymer of the present invention is one of a conjugated diene homopolymer and a conjugated diene copolymer, and the hydrogenation is performed at a temperature ranged from 0□ to 200□ and at a hydrogen pressure ranged from 1 to 90 kg/cm². Furthermore, the first position is present in an amount of 0.001 to 50 millimoles based on 100 g of the polymer.

The above contents and advantages of the present invention will become more readily apparent to those ordinarily skilled in the art after reviewing the following detailed descriptions and accompanying drawings as following.

DETAILED DESCRIPTION OF THE PREFERRED EMBODIMENT

Figure 1:
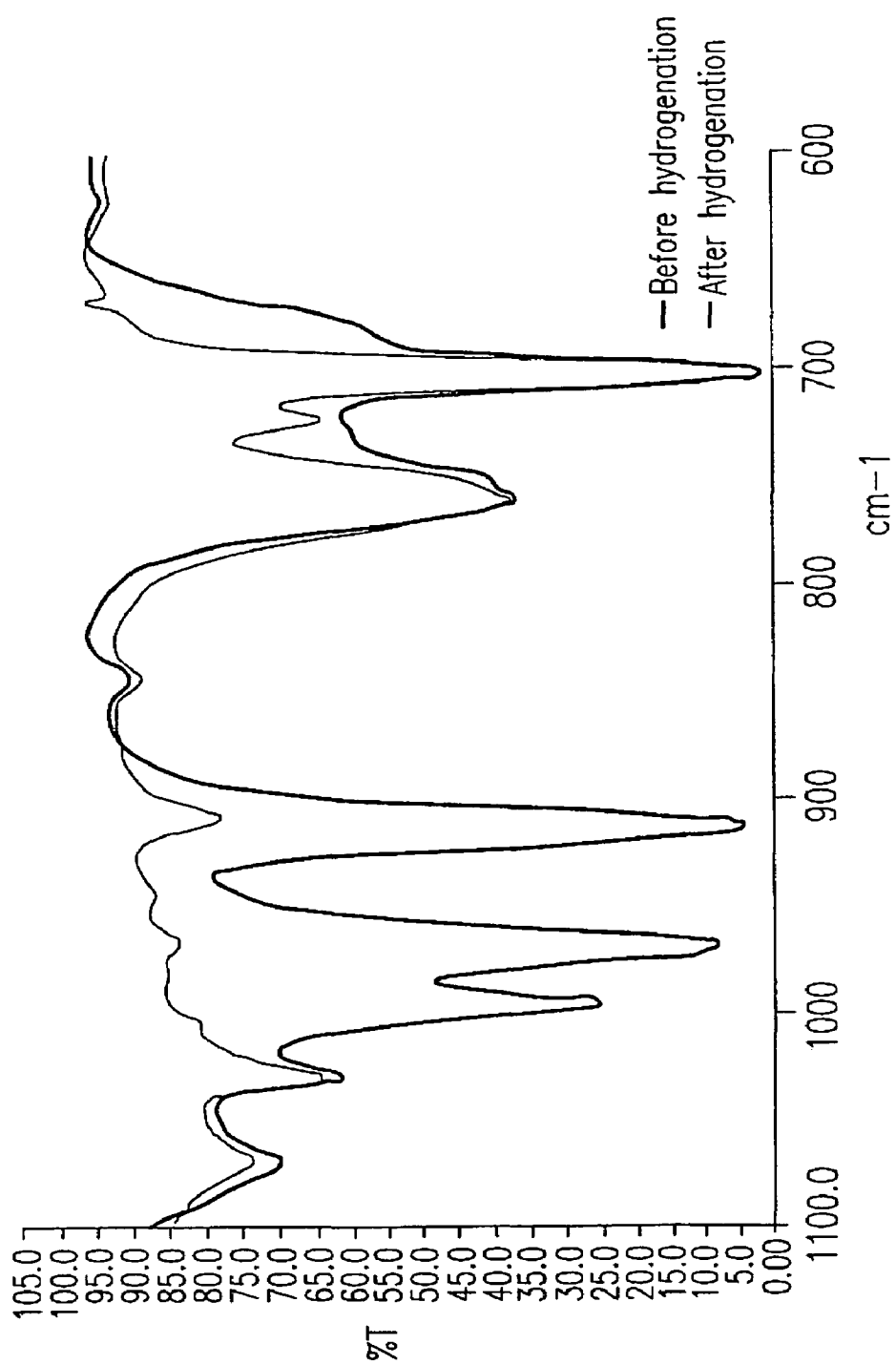
FIG. 1 is the IR spectrum schematically showing the SBS copolymer of Example 2 of the present invention before and after hydrogenation.

The present invention provides the catalyst compositions (a), (b) and (c) for hydrogenating a polymer having a conjugated diene, and the catalyst composition (a) is a first composition having one of a titanium compound of a formula (I) and a mixture thereof:

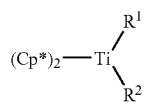
(I)

wherein $R^1$ and $R^2$ are identical or different and are ones selected from the group consisting of hydrogen, halogen, $C_1$~$C_8$ alkyl, $C_1$~$C_8$ alkoxy, $C_6$~$C_{12}$ cycloalkyl, phenyl, phenoxy, $C_7$~$C_{10}$ arylalkoxy, $C_7$~$C_{10}$ arylalkyl, carboxy, —$CH_2P$(phenyl)$_2$, —$CH_2Si(C_1$~$C_5$ alkyl)$_3$ and —P(phenyl)$_2$; and Cp* is one selected from the group consisting of cyclopentadienyl, fluorenyl, indenyl and derivatives thereof For example, Cp* could be $C_5R^7R^8R^9R^{10}R^{11}$ (cyclopentadienyl and derivatives thereof), wherein $R^7$, $R^8$, $R^9$, $R^{10}$ and $R^{11}$ could be the same or different and are ones selected from the group consisting of hydrogen, halogen, alkyl, aryl, carboxyl, —$CH_2P$(phenyl)$_2$, —$CH_2Si(C_1$~$C_5$ alkyl)$_3$ and —P(phenyl)$_2$.

According to the catalyst composition (a) of the formula (I), a bis(cyclopentadienyl, fluorenyl, indenyl and a derivative thereof)titanium halide used suitably in the present invention could be one selected from the group consisting of bis(cyclopentadienyl)titanium difluorides, bis(cyclopentadienyl)titanium dichlorides, bis[(2,4-diphenylphosphinecyclopentadienyl)]titanium difluorides, bis[(2,4-dimethylphosphinecyclopentadienyl)]titanium difluorides, bis[(2,4-diphenylphosphinecyclopentadienyl)]titanium dichlorides, dimethoxy bis(cyclopentadienyl)titanium dichlorides, bis[(2,4-dimethylphosphinecyclopentadienyl)] titanium dichlorides, bis(cyclopentadienyl)titanium dibromides, bis[(2,4-dimethylphosphinecyclopentadienyl)]titanium dibromides, bis(ethylcyclopentadienyl)titanium dichlorides, bis(n-propylcyclopentadienyl)titanium dichlorides, bis(n-butylcyclopentadienyl)titanium dichlorides, bis(2-ethylhexylcyclopentadienyl)titanium dichlorides, (dimethylsilylene)-bis($\eta^5$-2,4-cyclopentadien-1-ylidene) and (ethylene)-bis($\eta^5$-2,4-cyclopentadien-1-ylidene).

According to the catalyst composition (a) of the formula (I), an organic carbohydrate of a bis(cyclopentadienyl and a derivative thereof)titanium in the present invention could be one selected from the group consisting of bis(cyclopentadienyl)titanium dimethyl, bis(cyclopentadienyl)titanium dimethoxy, bis(2,4-diphenylphosphinecyclopentadienyl)titanium dimethoxy, bis(2,4-dimethylphosphinecyclopentadienyl)titanium dimethoxy, bis(cyclopentadienyl)titanium diethoxy, bis(2,4-diphenylphosphinecyclopentadienyl)titanium diethoxy, bis(2,4-dimethylphosphinecyclopentadienyl) titanium diethoxy, bis(2,4-diphenylphosphinecyclopentadienyl)titanium diphenoxy and bis(2,4-dimethylphosphinecyclopentadienyl)titanium diphenoxy.

According to the catalyst composition (a) of the formula (I), a bis(fluorenyl, indenyl and a derivative thereof)titanium halide in the present invention could be one selected from the group consisting of bis(1-fluorenyl)titanium dichlorides, bis (1-indenyl)titanium dichlorides, bis(dimethoxylfluorenyl)titanium dichlorides, bis(indenyl)titanium dichlorides, bis (fluorenyl)titanium difluorides, bis(indenyl)titanium difluorides, bis(dimethoxylfluorenyl)titanium difluorides, bis (fluorenyl)titanium dibromides, bis(dimethoxylfluorenyl)titanium and bis(indenyl)titanium dibromides.

According to the catalyst composition (a) of the formula (I), an organic carbohydrate selected from the group consisting of bis(fluorenyl, indenyl and a derivative thereof)titanium used suitably in the present invention could be one selected from the group consisting of bis(fluorenyl)titanium dimethyl, bis(fluorenyl)titanium dimethoxy, bis(indenyl)titanium dimethoxy, bis(dimethoxylfluorenyl)titanium dimethoxy, bis (indenyl)titanium dimethoxy, bis(fluorenyl)titanium dimethanol, bis(indenyl)titanium dimethanol, bis (dimethoxylfluorenyl)titanium dimethanol, bis(indenyl)titanium dimethanol, bis(fluorenyl)titanium diphenoxy, bis(indenyl)titanium diphenoxy, bis(dimethoxylfluorenyl)titanium diphenoxy and bis(indenyl)titanium diphenoxy, and the derivative here indicates that there is a substituent on the indenyl, fluorenyl, or cyclopentadienyl ring, and the substituent could be one or more from methyl, methoxy, p-tert-butylphenyl, pentafluorophenyl, trifluorophenyl, difluorophenyl, or 3,5-(tert-butyl)-4-methoxyphenyl. A preferred example of the catalyst composition (a) is bis(cyclopentadienyl)titanium dichloride.

A second composition (b) having one selected from the group consisting of a first compound of a formula (II), a second compound of a formula (III):

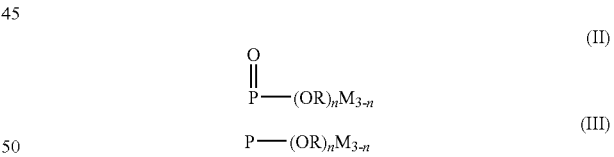

wherein the R is one selected from the group consisting of $C_1$~$C_{12}$ alkyl, $C_3$~$C_{12}$ cycloalkyl, aryl, and alkyl aryl, the M is one selected from the group consisting of $C_1$~$C_{12}$ alkyl, $C_1$~$C_{12}$ alkoxy, aryl, alkyl aryl, phenoxy and hydroxyl and n=1 to 3.

According to the present invention, the second composition (b) is a compound of the formula (II) and the R is one of $C_1$~$C_{12}$ alkyl, $C_1$~$C_{12}$ cycloalkyl, aryl and alkyl aryl.

For example, the R of the second composition (b) is one of $C_1$~$C_{12}$ alkyl, $C_3$~$C_{12}$ cycloalkyl, aryl and alkyl aryl, where n=3, the second composition (b) could be one selected from the group consisting of trimethyl phosphate, triethyl phosphate, tripropyl phosphate, tri(isopropyl)phosphate, tributyl phosphate, tri(isobutyl)phosphate, tri(sec-butyl)phosphate, tri(tert-butyl)phosphate, tri(cyclopropyl)phosphate, tri(cyclohexyl)phosphate, triphenyl phosphite, triphenylmethyl phosphate, triphenylethyl phosphite, triphenylpropyl phosphite, triphenylisopropyl phosphite, triphenyl-n-butyl phosphite, triphenyl-sec-butyl phosphite, triphenylisobutyl phosphite and triphenyl-tert-butyl phosphite.

For example, the R of the second composition (b) is one of $C_1$~$C_{12}$ alkyl and the M thereof is one of $C_1$~$C_{12}$ alkyl, alkoxy, aryl, alkyl aryl, phenoxy and hydroxyl, where n=2, the second composition (b) could be one selected from the group consisting of dimethyl methylphosphonate, dimethyl ethylphosphonate, dimethyl propylphosphonate, dimethyl butylphosphonate, diethyl methylphosphonate, diethyl ethylphosphonate, diethyl propylphosphonate, diethyl butylphosphonate, dipropyl methylphosphonate, dipropyl ethylphosphonate, dipropyl propylphosphonate, dipropyl butylphosphonate, dibutyl methylphosphonate, dibutyl ethylphosphonate, dibutyl propylphosphonate, dibutyl butylphosphonate, diethyl oxymethanephosphonate, dipropyl oxymethanephosphonate, dibutyl oxymethanephosphonate, dimethyl oxyethanephosphonate, dipropyl oxyethanephosphonate, dibutyl oxyethanephosphonate, dimethyl oxypropanephosphonate, diethyl oxypropanephosphonate, dibutyl oxypropanephosphonate, dimethyl oxybutanephosphonate, diethyl oxybutanephosphonate, dipropyl oxybutanephosphonate, dimethyl phenylphosphonate, diethyl phenylphosphonate, dipropyl phenylphosphonate, dibutyl phenylphosphonate, dimethyl methylphenylphosphonate, diethyl methylphenylphosphonate, dipropyl methylphenylphosphonate, dibutyl methylphenylphosphonate, dimethyl ethylphenylphosphonate, diethyl ethylphenylphosphonate, dipropyl ethylphenylphosphonate, dibutyl ethylphenylphosphonate, dimethyl propylphenylphosphonate, diethyl propylphenylphosphonate, dipropyl propylphenylphosphonate, dibutyl propylphenylphosphonate, dimethyl butylphenylphosphonate, diethyl butylphenylphosphonate, dipropyl butylphenylphosphonate, dibutyl butylphenylphosphonate, dimethyl phenoxyphosphonate, diethyl phenoxyphosphonate, dipropyl phenoxyphosphonate, dibutyl phenoxyphosphonate, dimethyl phosphonate, diethyl phosphonate, dipropyl phosphonate and dibutyl phosphonate.

For example, the R of the second composition (b) is one of $C_3$~$C_{12}$ cycloalkyl and the M thereof is one of $C_1$~$C_{12}$ alkyl, alkoxy, aryl, alkyl aryl, phenoxy and hydroxyl, where n=2, the second composition (b) could be one selected from the group consisting of dicyclopropyl methylphosphonate, dicyclopropyl ethylphosphonate, dicyclopropyl propylphosphonate, dicyclopropyl butylphosphonate, dicyclohexyl methylphosphonate, dicyclohexyl ethylphosphonate, dicyclohexyl propylphosphonate, dicyclohexyl butylphosphonate, dicyclopropyl oxymethanephosphonate, dicyclohexyl oxymethanephosphonate, dicyclopropyl oxyethanephosphonate, dicyclohexyl oxyethanephosphonate, dicyclopropyl oxypropanephosphonate, dicyclohexyl oxypropanephosphonate, dicyclopropyl oxybutanephosphonate, dicyclohexyl oxybutanephosphonate, dicyclopropyl phenylphosphonate, dicyclohexyl phenylphosphonate, dicyclopropyl methylphenylphosphonate, dicyclohexyl methylphenylphosphonate, dicyclopropyl ethylphenylphosphonate, dicyclohexyl ethylphenylphosphonate, dicyclopropyl propylphenylphosphonate, dicyclohexyl propylphenylphosphonate, dicyclopropyl butylphenylphosphonate, dicyclohexyl butylphenylphosphonate, dicyclopropyl phenoxyphosphonate, dicyclohexyl phenoxyphosphonate, dicyclopropyl phosphonate and dicyclohexyl phosphonate.

For example, the R of the second composition (b) is aryl or alkyl aryl and the M thereof is one of $C_1$~$C_{12}$ alkyl, alkoxy, aryl, alkyl aryl, phenoxy and hydroxyl, where n=2, the second composition (b) could be one selected from the group consisting of diphenyl methylphosphonate, diphenyl ethylphosphonate, diphenyl propylphosphonate, diphenyl butylphosphonate, dimethylphenyl methylphosphonate, dimethylphenyl ethylphosphonate, dimethylphenyl propylphosphonate, dimethylphenyl butylphosphonate, diethylphenyl methylphosphonate, diethylphenyl ethylphosphonate, diethylphenyl propylphosphonate, diethylphenyl butylphosphonate, dipropylphenyl methylphosphonate, dipropylphenyl ethylphosphonate, dipropylphenyl propylphosphonate, dipropylphenyl butylphosphonate, dibutylphenyl methylphosphonate, dibutylphenyl ethylphosphonate, dibutylphenyl propylphosphonate, dibutylphenyl butylphosphonate, diphenyl oxymethanephosphonate, dimethylphenyl oxymethanephosphonate, diethylphenyl oxymethanephosphonate, dipropylphenyl oxymethanephosphonate, dibutylphenyl oxymethanephosphonate, diphenyl oxyethanephosphonate, dimethylphenyl oxyethanephosphonate, diethylphenyl oxyethanephosphonate, dipropylphenyl oxyethanephosphonate, dibutylphenyl oxyethanephosphonate, diphenyl oxypropanephosphonate, dimethylphenyl oxypropanephosphonate, diethylphenyl oxypropanephosphonate, dipropylphenyl oxypropanephosphonate, dibutylphenyl oxypropanephosphonate, diphenyl oxybutanephosphonate, dimethylphenyl oxybutanephosphonate, diethylphenyl oxybutanephosphonate, dipropylphenyl oxybutanephosphonate, dibutylphenyl oxybutanephosphonate, diphenyl phenylphosphonate, dimethylphenyl phenylphosphonate, diethylphenyl phenylphosphonate, dipropylphenyl phenylphosphonate, dibutylphenyl phenylphosphonate, diphenyl methylphenylphosphonate, dimethylphenyl methylphenylphosphonate, diethylphenyl methylphenylphosphonate, dipropylphenyl methylphenylphosphonate, dibutylphenyl methylphenylphosphonate, diphenyl ethylphenylphosphonate, dimehtylphenyl ethylphenylphosphonate, diethylphenyl ethylphenylphosphonate, dipropylphenyl ethylphenylphosphonate, dibutylphenyl ethylphenylphosphonate, diphenyl propylphenylphosphonate, dimehtylphenyl propylphenylphosphonate, diethylphenyl propylphenylphosphonate, dipropylphenyl propylphenylphosphonate, dibutylphenyl propylphenylphosphonate, diphenyl butylphenylphosphonate, dimehtylphenyl butylphenylphosphonate, diethylphenyl butylphenylphosphonate, dipropylphenyl butylphenylphosphonate, dibutylphenyl butylphenylphosphonate, dimethylphenyl phenoxyphosphonate, diethylphenyl phenoxyphosphonate, dipropylphenyl phenoxyphosphonate, dibutylphenyl phenoxyphosphonate, diphenyl phosphonate, dimethylphenyl phosphonate, diethylphenyl phosphonate, dipropylphenyl phosphonate and dibutylphenyl phosphonate.

For example, the R of the second composition (b) is one of $C_1$~$C_{12}$ alkyl and the M thereof is one of $C_1$~$C_{12}$ alkyl, alkoxy, aryl, alkyl aryl, phenoxy and hydroxyl, where n=1, the second composition (b) could be one selected from the group consisting of methyl dimethylphosphonate, methyl diethylphosphonate, methyl dipropylphosphonate, methyl dibutylphosphonate, ethyl dimethylphosphonate, ethyl diethylphosphonate, ethyl dipropylphosphonate, ethyl dibutylphosphonate, propyl dimethylphosphonate, propyl diethylphosphonate, propyl dipropylphosphonate, propyl dibutylphosphonate, butyl dimethylphosphonate, butyl diethylphosphonate, butyl dipropylphosphonate, butyl dibutylphosphonate, ethyl dioxymethanephosphonate, propyl dioxymethanephosphonate, butyl dioxymethanephosphonate, methyl dioxyethanephosphonate, propyl dioxyethanephosphonate, butyl dioxyethanephosphonate, methyl dioxypropanephosphonate, ethyl dioxypropanephosphonate, butyl dioxypropanephosphonate, methyl dioxybutanephosphonate, ethyl dioxybutanephosphonate, propyl dioxybutanephosphonate, methyl diphenylphosphonate, ethyl diphenylphosphonate, propyl diphenylphosphonate, butyl diphenylphosphonate, methyl dimethylphenylphosphonate, ethyl dimethylphenylphosphonate, propyl dimethylphenylphosphonate, butyl dimethylphenylphosphonate, methyl diethylphenylphosphonate, ethyl diethylphenylphosphonate, propyl diethylphenylphosphonate, butyl diethylphenylphosphonate, methyl dipropylphenylphosphonate, ethyl dipropylphenylphosphonate, propyl dipropylphenylphosphonate, butyl dipropylphenylphosphonate, methyl dibutylphenylphosphonate, ethyl dibutylphenylphosphonate, propyl dibutylphenylphosphonate, butyl dibutylphenylphosphonate, methyl diphenoxyphosphonate, ethyl diphenoxyphosphonate, propyl diphenoxyphosphonate, butyl diphenoxyphosphonate, methyl phosphonate, ethyl phosphonate, propyl phosphonate and butyl phosphonate.

For example, the R of the second composition (b) is one of $C_3$~$C_{12}$ cycloalkyl and the M thereof is one of $C_1$~$C_{12}$ alkyl, alkoxy, aryl, alkyl aryl, phenoxy and hydroxyl, where n=1, the second composition (b) could be one selected from the group consisting of cyclopropyl dimethylphosphonate, cyclopropyl diethylphosphonate, cyclopropyl dipropylphosphonate, cyclopropyl dibutylphosphonate, cyclohexyl dimethylphosphonate, cyclohexyl diethylphosphonate, cyclohexyl dipropylphosphonate, cyclohexyl dibutylphosphonate, cyclopropyl dioxymethanephosphonate, cyclohexyl dioxymethanephosphonate, cyclopropyl dioxyethanephosphonate, cyclohexyl dioxyethanephosphonate, cyclopropyl dioxypropanephosphonate, cyclohexyl dioxypropanephosphonate, cyclopropyl dioxybutanephosphonate, cyclohexyl dioxybutanephosphonate, cyclopropyl diphenylphosphonate, cyclohexyl diphenylphosphonate, cyclopropyl dimethylphenylphosphonate, cyclohexyl dimethylphenylphosphonate, cyclopropyl diethylphenylphosphonate, cyclohexyl diethylphenylphosphonate, cyclopropyl dipropylphenylphosphonate, cyclohexyl dipropylphenylphosphonate, cyclopropyl dibutylphenylphosphonate, cyclohexyl dibutylphenylphosphonate, cyclopropyl diphenoxyphosphonate, cyclohexyl diphenoxyphosphonate, cyclopropyl phosphonate and cyclohexyl phosphonate.

For example, the R of the second composition (b) is aryl or alkyl aryl and the M thereof is one of $C_1$~$C_{12}$ alkyl, alkoxy, aryl, alkyl aryl, phenoxy and hydroxyl, where n=1, the second composition (b) could be one selected from the group consisting of phenyl dimethylphosphonate, phenyl diethylphosphonate, phenyl dipropylphosphonate, phenyl dibutylphosphonate, methylphenyl dimethylphosphonate, methylphenyl diethylphosphonate, methylphenyl dipropylphosphonate, methylphenyl dibutylphosphonate, ethylphenyl dimethylphosphonate, ethylphenyl diethylphosphonate, ethylphenyl dipropylphosphonate, ethylphenyl dibutylphosphonate, propylphenyl dimethylphosphonate, propylphenyl diethylphosphonate, propylphenyl dipropylphosphonate, propylphenyl dibutylphosphonate, butylphenyl dimethylphosphonate, butylphenyl diethylphosphonate, butylphenyl dipropylphosphonate, butylphenyl dibutylphosphonate, phenyl dioxymethanephosphonate, methylphenyl dioxymethanephosphonate, ethylphenyl dioxymethanephosphonate, propylphenyl dioxymethanephosphonate, butylphenyl dioxymethanephosphonate, phenyl dioxyethanephosphonate, methylphenyl dioxyethanephosphonate, ethylphenyl dioxyethanephosphonate, propylphenyl dioxyethanephosphonate, butylphenyl dioxyethanephosphonate, phenyl bis(oxy-n-propane)phosphonate, methylphenyl bis(oxy-n-propane)phosphonate, ethylphenyl bis(oxy-n-propane)phosphonate, propylphenyl bis(oxy-n-propane)phosphonate, butylphenyl bis(oxy-n-propane)phosphonate, phenyl dioxyisopropanephosphonate, methylphenyl dioxyisopropanephosphonate, ethylphenyl dioxyisopropanephosphonate, propylphenyl dioxyisopropanephosphonate, butylphenyl dioxyisopropanephosphonate, phenyl bis(oxy-n-butane)phosphonate, methylphenyl bis(oxy-n-butane)phosphonate, ethylphenyl bis(oxy-n-butane)phosphonate, propylphenyl bis(oxy-n-butane)phosphonate, butylphenyl bis(oxy-n-butane)phosphonate, phenyl diphenylphosphonate, methylphenyl diphenylphosphonate, ethylphenyl diphenylphosphonate, propylphenyl diphenylphosphonate, butylphenyl diphenylphosphonate, phenyl dimethylphenylphosphonate, methylphenyl dimethylphenylphosphonate, ethylphenyl dimethylphenylphosphonate, propylphenyl dimethylphenylphosphonate, butylphenyl dimethylphenylphosphonate, phenyl diethylphenylphosphonate, mehtylphenyl diethylphenylphosphonate, ethylphenyl diethylphenylphosphonate, propylphenyl diethylphenylphosphonate, butylphenyl diethylphenylphosphonate, phenyl dipropylphenylphosphonate, mehtylphenyl dipropylphenylphosphonate, ethylphenyl dipropylphenylphosphonate, propylphenyl dipropylphenylphosphonate, butylphenyl dipropylphenylphosphonate, phenyl dibutylphenylphosphonate, mehtylphenyl dibutylphenylphosphonate, ethylphenyl dibutylphenylphosphonate, propylphenyl dibutylphenylphosphonate, butylphenyl dibutylphenylphosphonate, phenyl diphenoxyphosphonate, methylphenyl diphenoxyphosphonate, ethylphenyl diphenoxyphosphonate, propylphenyl diphenoxyphosphonate, butylphenyl diphenoxyphosphonate, phenyl phosphonate, methylphenyl phosphonate, ethylphenyl phosphonate, propylphenyl phosphonate and butylphenyl phosphonate.

When the second composition (b) is a compound of the formula (III) and the R is one of $C_1$~$C_{12}$ alkyl, $C_3$~$C_{12}$ cycloalkyl, aryl and alkyl aryl.

For example, the R of the second composition (b) is one of $C_1$~$C_{12}$ alkyl, $C_3$~$C_{12}$ cycloalkyl, aryl and alkyl aryl, where n=3, the second composition (b) could be one selected from the group consisting of trimethyl phosphite, triethyl phosphite, tripropyl phosphite, tributyl phosphite, tricyclopropyl phosphite, tricyclohexyl phosphite, triphenyl phosphite, trimethylphenyl phosphite, triethylphenyl phosphite, tripropylphenyl phosphite and tributylphenyl phosphite.

For example, the R of the second composition (b) is one of $C_1$~$C_{12}$ alkyl and the M thereof is one of $C_1$~$C_{12}$ alkyl, alkoxy, aryl, alkyl aryl and phenoxy, where n=2, the second composition (b) could be one selected from the group consisting of methyl dimethoxyphosphine, ethyl dimethoxyphosphine, propyl dimethoxyphosphine, butyl dimethoxyphosphine, methyl diethoxyphosphine, ethyl diethoxyphosphine, propyl diethoxyphosphine, butyl diethoxyphosphine, methyl dipropoxyphosphine, ethyl dipropoxyphosphine, propyl dipropoxyphosphine, butyl dipropoxyphosphine, methyl dibutoxyphosphine, ethyl dibutoxyphosphine, propyl dibutoxyphosphine, butyl dibutoxyphosphine, ethaneoxy dimethoxyphosphine, propaneoxy dimethoxyphosphine, methaneoxy diethoxyphosphine, propaneoxy diethoxyphosphine, butaneoxy diethoxyphosphine, methaneoxy dipropoxyphosphine, ethaneoxy dipropoxyphosphine, butaneoxy dipropoxyphosphine, methaneoxy dibutoxyphosphine, ethaneoxy dibutoxyphosphine, propaneoxy dibutoxyphosphine, phenyl dimethoxyphosphine, methylphenyl dimethoxyphosphine, ethylphenyl dimethoxyphosphine, propylphenyl dimethoxyphosphine, butylphenyl dimethoxyphosphine, phenoxy dimethoxyphosphine, phenyl diethoxyphosphine, methylphenyl diethoxyphosphine, ethylphenyl diethoxyphosphine, propylphenyl diethoxyphosphine, butylphenyl diethoxyphosphine, phenoxy diethoxyphosphine, phenyl dipropoxyphosphine, methylphenyl dipropoxyphosphine, ethylphenyl dipropoxyphosphine, propylphenyl dipropoxyphosphine, butylphenyl dipropoxyphosphine, phenoxy dipropoxyphosphine, phenyl dibutoxyphosphine, methylphenyl dibutoxyphosphine, ethylphenyl dibutoxyphosphine, propylphenyl dibutoxyphosphine, butylphenyl dibutoxyphosphine and phenoxy dibutoxyphosphine.

For example, the R of the second composition (b) is one of $C_3$~$C_{12}$ cycloalkyl and the M thereof is one of $C_1$~$C_{12}$ alkyl, alkoxy, aryl, alkyl aryl and phenoxy, where n=2, the second composition (b) could be one selected from the group consisting of methyl dicyclopropoxyphosphine, ethyl dicyclopropoxyphosphine, propyl dicyclopropoxyphosphine, butyl dicyclopropoxyphosphine, methyl dicyclobutoxyphosphine, ethyl dicyclobutoxyphosphine, propyl dicyclobutoxyphosphine, butyl dicyclobutoxyphosphine, oxymethane dicyclopropoxyphosphine, oxyethane dicyclopropoxyphosphine, oxypropane dicyclopropoxyphosphine, oxybutane dicyclopropoxyphosphine, oxymethane dicyclobutoxyphosphine, oxyethane dicyclobutoxyphosphine, oxypropane dicyclobutoxyphosphine, oxybutane dicyclobutoxyphosphine, phenyl dicyclopropoxyphosphine, methylphenyl dicyclopropoxyphosphine, ethylphenyl dicyclopropoxyphosphine, propylphenyl dicyclopropoxyphosphine, butylphenyl dicyclopropoxyphosphine, phenoxy dicyclopropoxyphosphine, phenyl dicyclobutoxyphosphine, methylphenyl dicyclobutoxyphosphine, ethylphenyl dicyclobutoxyphosphine, propylphenyl dicyclobutoxyphosphine, butylphenyl dicyclobutoxyphosphine and phenoxy dicyclobutoxyphosphine.

For example, the R of the second composition (b) is aryl or alkyl aryl and the M thereof is one of $C_1$~$C_{12}$ alkyl, alkoxy, aryl, alkyl aryl and phenoxy, where n=2, the second composition (b) could be one selected from the group consisting of methyl diphenoxyphosphine, ethyl diphenoxyphosphine, propyl diphenoxyphosphine, butyl diphenoxyphosphine, methyl dimethphenoxyphosphine, ethyl dimethphenoxyphosphine, propyl dimethphenoxyphosphine, butyl dimethphenoxyphosphine, methyl diethphenoxyphosphine, ethyl diethphenoxyphosphine, propyl diethphenoxyphosphine, butyl diethphenoxyphosphine, methyl diprophenoxyphosphine, ethyl diprophenoxyphosphine, propyl diprophenoxyphosphine, butyl diprophenoxyphosphine, methyl dibutphenoxyphosphine, ethyl dibutphenoxyphosphine, propyl dibutphenoxyphosphine, butyl dibutphenoxyphosphine, oxymethane diphenoxyphosphine, oxyethane diphenoxyphosphine, oxypropane diphenoxyphosphine, oxybutane diphenoxyphosphine, oxymethane dimethphenoxyphosphine, oxyethane dimethphenoxyphosphine, oxypropane dimethphenoxyphosphine, oxybutane dimethphenoxyphosphine, oxymethane diethphenoxyphosphine, oxyethane diethphenoxyphosphine, oxypropane diethphenoxyphosphine, oxybutane diethphenoxyphosphine, oxymethane diprophenoxyphosphine, oxyethane diprophenoxyphosphine, oxypropane diprophenoxyphosphine, oxybutane diprophenoxyphosphine, oxymethane dibutphenoxyphosphine, oxyethane dibutphenoxyphosphine, oxypropane dibutphenoxyphosphine, oxybutane dibutphenoxyphosphine, phenyl diphenoxyphosphine, methylphenyl diphenoxyphosphine, ethylphenyl diphenoxyphosphine, propylphenyl diphenoxyphosphine, butylphenyl diphenoxyphosphine, phenyl dimethphenoxyphosphine, methylphenyl dimethphenoxyphosphine, ethylphenyl dimethphenoxyphosphine, propylphenyl dimethphenoxyphosphine, butylphenyl dimethphenoxyphosphine, phenoxy dimethphenoxyphosphine, phenyl diethphenoxyphosphine, methylphenyl diethphenoxyphosphine, ethylphenyl diethphenoxyphosphine, propylphenyl diethphenoxyphosphine, butylphenyl diethphenoxyphosphine, phenoxy diethphenoxyphosphine, phenyl diprophenoxyphosphine, methylphenyl diprophenoxyphosphine, ethylphenyl diprophenoxyphosphine, propylphenyl diprophenoxyphosphine, butylphenyl diprophenoxyphosphine, phenoxy diprophenoxyphosphine, phenyl dibutphenoxyphosphine, methylphenyl dibutphenoxyphosphine, ethylphenyl dibutphenoxyphosphine, propylphenyl dibutphenoxyphosphine, butylphenyl dibutphenoxyphosphine and phenoxy dibutphenoxyphosphine.

For example, the R of the second composition (b) is one of $C_1$~$C_{12}$ alkyl and the M thereof is one of $C_1$~$C_{12}$ alkyl, alkoxy, aryl, alkyl aryl and phenoxy, where n=1, the second composition (b) could be one selected from the group consisting of dimethyl methoxyphosphine, diethyl methoxyphosphine, dipropyl methoxyphosphine, dibutyl methoxyphosphine, dimethyl ethoxyphosphine, diethyl ethoxyphosphine, dipropyl ethoxyphosphine, dibutyl ethoxyphosphine, dimethyl propoxyphosphine, diethyl propoxyphosphine, dipropyl propoxyphosphine, dibutyl propoxyphosphine, dimethyl butpoxyphosphine, diethyl butpoxyphosphine, dipropyl butpoxyphosphine, dibutyl butpoxyphosphine, dioxyethane methoxyphosphine, dioxypropane methoxyphosphine, dioxybutane methoxyphosphine, dioxymethane ethoxyphosphine, dioxypropane ethoxyphosphine, dioxybutane ethoxyphosphine, dioxymethane propoxyphosphine, dioxyethane propoxyphosphine, dioxybutane propoxyphosphine, dioxymethane butoxyphosphine, dioxyethane butoxyphosphine, dioxypropane butoxyphosphine, diphenyl methoxyphosphine, dimethylphenyl methoxyphosphine, diethylphenyl methoxyphosphine, dipropylphenyl methoxyphosphine, dibutylphenyl methoxyphosphine, diphenoxy methoxyphosphine, diphenyl ethoxyphosphine, dimethylphenyl ethoxyphosphine, diethylphenyl ethoxyphosphine, dipropylphenyl ethoxyphosphine, dibutylphenyl ethoxyphosphine, diphenoxy ethoxyphosphine, diphenyl propoxyphosphine, dimethylphenyl propoxyphosphine, diethylphenyl propoxyphosphine, dipropylphenyl propoxyphosphine, dibutylphenyl propoxyphosphine, diphenoxy propoxyphosphine, diphenyl butoxyphosphine, dimethylphenyl butoxyphosphine, diethylphenyl butoxyphosphine, dipropylphenyl butoxyphosphine, dibutylphenyl butoxyphosphine and diphenoxy butoxyphosphine.

For example, the R of the second composition (b) is one of $C_3$~$C_{12}$ cycloalkyl and the M thereof is one of $C_1$~$C_{12}$ alkyl, alkoxy, aryl, alkyl aryl and phenoxy, where n=1, the second composition (b) could be one selected from the group consisting of dimethyl cyclopropoxyphosphine, diethyl cyclopropoxyphosphine, dipropyl cyclopropoxyphosphine, dibutyl cyclopropoxyphosphine, dimethyl cyclobutoxyphosphine, diethyl cyclobutoxyphosphine, dipropyl cyclobutoxyphosphine, dibutyl cyclobutoxyphosphine, dioxymethane cyclopropoxyphosphine, dioxyethane cyclopropoxyphosphine, dioxypropane cyclopropoxyphosphine, dioxybutane cyclopropoxyphosphine, dioxymethane cyclobutoxyphosphine, dioxyethane cyclobutoxyphosphine, dioxypropane cyclobutoxyphosphine, dioxybutane cyclobutoxyphosphine, diphenyl cyclopropoxyphosphine, dimethylphenyl cyclopropoxyphosphine, diethylphenyl cyclopropoxyphosphine, dipropylphenyl cyclopropoxyphosphine, dibutylphenyl cyclopropoxyphosphine, diphenoxy cyclopropoxyphosphine, diphenyl cyclobutoxyphosphine, dimethylphenyl cyclobutoxyphosphine, diethylphenyl cyclobutoxyphosphine, dipropylphenyl cyclobutoxyphosphine, dibutylphenyl cyclobutoxyphosphine and diphenoxy cyclobutoxyphosphine.

For example, the R of the second composition (b) is aryl or alkyl aryl and the M thereof is one of $C_1$~$C_{12}$ alkyl, alkoxy, aryl, alkyl aryl and phenoxy, where n=1, the second composition (b) could be one selected from the group consisting of dimethyl phenoxyphosphine, diethyl phenoxyphosphine, dipropyl phenoxyphosphine, dibutyl phenoxyphosphine, dimethyl methphenoxyphosphine, diethyl methphenoxyphosphine, dipropyl methphenoxyphosphine, dibutyl methphenoxyphosphine, dimethyl ethphenoxyphosphine, diethyl ethphenoxyphosphine, dipropyl ethphenoxyphosphine, dibutyl ethphenoxyphosphine, dimethyl prophenoxyphosphine, diethyl prophenoxyphosphine, dipropyl prophenoxyphosphine, dibutyl prophenoxyphosphine, dimethyl butphenoxyphosphine, diethyl butphenoxyphosphine, dipropyl butphenoxyphosphine, dibutyl butphenoxyphosphine, dioxymethane phenoxyphosphine, dioxyethane phenoxyphosphine, dioxypropane phenoxyphosphine, dioxybutane phenoxyphosphine, dioxymethane methphenoxyphosphine, dioxyethane methphenoxyphosphine, dioxypropane methphenoxyphosphine, dioxybutane methphenoxyphosphine, dioxymethane ethphenoxyphosphine, dioxyethane ethphenoxyphosphine, dioxypropane ethphenoxyphosphine, dioxybutane ethphenoxyphosphine, dioxymethane prophenoxyphosphine, dioxyethane prophenoxyphosphine, dioxypropane prophenoxyphosphine, dioxybutane prophenoxyphosphine, dioxymethane butphenoxyphosphine, dioxyethane butphenoxyphosphine, dioxypropane butphenoxyphosphine, dioxybutane butphenoxyphosphine, diphenyl phenoxyphosphine, dimethylphenyl phenoxyphosphine, diethylphenyl phenoxyphosphine, dipropylphenyl phenoxyphosphine, dibutylphenyl phenoxyphosphine, diphenyl methphenoxyphosphine, dimethylphenyl methphenoxyphosphine, diethylphenyl methphenoxyphosphine, dipropylphenyl methphenoxyphosphine, dibutylphenyl methphenoxyphosphine, diphenoxy methphenoxyphosphine, diphenyl ethphenoxyphosphine, dimethylphenyl ethphenoxyphosphine, diethylphenyl ethphenoxyphosphine, dipropylphenyl ethphenoxyphosphine, dibutylphenyl ethphenoxyphosphine, diphenoxy ethphenoxyphosphine, diphenyl prophenoxyphosphine, dimethylphenyl prophenoxyphosphine, diethylphenyl prophenoxyphosphine, dipropylphenyl prophenoxyphosphine, dibutylphenyl prophenoxyphosphine, diphenoxy prophenoxyphosphine, diphenyl butphenoxyphosphine, dimethylphenyl butphenoxyphosphine, diethylphenyl butphenoxyphosphine, dipropylphenyl butphenoxyphosphine, dibutylphenyl butphenoxyphosphine and diphenoxy butphenoxyphosphine.

A third composition (c) of present invention having one selected from the group consisting of a compound of the formula (IV):

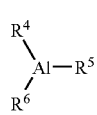

(IV)

wherein the $R^4$, $R^5$ and $R^6$ are identical or different and are ones selected from the group consisting of $C_1$~$C_{12}$ alkyl, $C_6$~$C_{12}$ aryl, hydrogen and halogen.

According to the present invention, the third composition (c) is a compound could be one selected from the group consisting of trimethyl aluminum, triethyl aluminum, tri-n-propyl aluminum, triisopropyl aluminum, tributyl aluminum, tri(sec-butyl)aluminum, tri(isobutyl)aluminum, tri(n-pentyl)aluminum, tri(isopentyl)aluminum, tri(n-hexyl)aluminum, tri(isohexyl)aluminum, tri(1-methylpentyl)aluminum, tri(2,5-dimethyloctyl)aluminum, tri(2,6-dimethyloctyl)aluminum, triphenyl aluminum, diethyl aluminum chloride, ethyl aluminum dichloride, tripropyl aluminum chloride, dibutyl aluminum chloride, diisobutyl aluminum chloride and butyl aluminum dichloride.

Preferably, the third composition (c) is triethyl aluminum, triisobutyl aluminum, tributyl aluminum, tri(isobutyl)aluminum or diethyl aluminum chloride.

The hydrogenation of the present invention involves bringing the conjugated diene polymer in one of an inert organic solvent and an inert organic solvent which includes a portion of ether and amine polar compound into contact with hydrogen in the presence of a hydrogenation catalyst composition of the present invention. Thus, the unsaturated double bonds in the conjugated diene units of the conjugated diene polymer are selectively hydrogenated. The hydrogenation catalyst composition of the present invention includes hydrogenation catalyst compositions (a), (b) and (c) as mentioned above. Specifically, for example, gaseous hydrogen is introduced into the conjugated diene polymer. Then, stirring or blasting is conducted to completely contact the hydrogen and conjugated diene polymer. Hydrogenation could be conducted by a batch or continuous methods.

The addition manner of the hydrogenation catalyst compositions (a), (b) and (c) is not limited. For example, catalyst composition (b) could be first added to the polymer solution whose activity has been terminated, and then a mixed solution of catalyst compositions (a) and (c) are added. Alternatively, catalyst composition (b) could be first added to the polymer solution whose activity has not been terminated, followed by a catalyst composition (a) solution and a catalyst composition (c) solution, respectively. Furthermore, catalyst compositions (b) and (c) also could be first added to the polymer solution after reacting, and then a reactant of catalyst compositions (a) and (c) are added. After all the catalysts are added to the polymer, the polymer is kept at the inert gas atmosphere. The catalyst composition still has relatively good activity even after storage for a long time. Therefore, the catalyst composition of the present invention is very suitable for the requirement of industrial mass production.

According to the present invention, the inert organic solvent to dissolve the hydrogenation catalysts and the conjugated diene polymer could be a linear or branched hydrocarbon compound such as pentane, hexane, heptane, octane and the like; or a cyclic hydrocarbon compound such as cyclohexane, cycloheptane, and methylheptane. Cyclohexane and n-hexane are the most suitable example. Alternatively, the inert organic solvent could be aromatic hydrocarbon such as benzene, toluene, xylene and ethylbenzene.

Preparation of catalyst compositions (a), (b) and (c) should be conducted in inert gas and low water content. The inert gas refers to helium, neon, nitrogen and the like, which will not participate in hydrogenation. Air, oxygen or high water content atmosphere will oxidize or decompose the hydrogenation catalysts, causing reduced activity in catalysts. In the condition under which the catalyst is pre-mixed, the temperature is preferably ranged from 0° C. to 200° C. The activity of catalyst would be reduced at a higher temperature but the hydrogenating ability would be disappeared since the activity of catalyst is lower at a lower temperature.

According to the present invention, conjugated diene polymers to be used in the present invention are produced by any of the methods known in the art, such as, for example, anionic polymerization, cationic polymerization, free radical polymerization, complex polymerization, solution polymerization, and emulsion polymerization. It is preferable to use an organic lithium compound to serve as a catalyst initiator, thus obtaining a living polymer. The living polymer contains a carbon-lithium ion at the terminal end of the molecule chain. Therefore, when the monomer is added, polymerization could further proceed to lengthen the molecule chain. Examples of such organic lithium compounds are monolithium compounds such as n-propyl lithium, iso-propyl lithium, n-butyl lithium, iso-butyl lithium, tert-butyl lithium, n-pentyl lithium, phenyl lithium, tolyl lithium and a dilithio hydrocarbon selected from the group consisting of 1,4-dilithio-n-butane, 1,5-dilithio-pentane, 1,2-dilithio-diphenyl ethane, 1,4-dilithio-1,1,4,4-tetraphenyl butane, 1,3- or 1,4-bis(1-litho-3-methylpentyl)-benzene and a combination thereof. The amount of such organic lithium compound may be suitably selected depending on the desired molecular weight of the polymer.

The term "conjugated diene polymer" as used in the present invention describes both a homopolymer and a copolymer of a conjugated diene. The above polymers contain an active radical or a non-active radical at the terminal end of the molecule chain. The active radical is one selected from the group consisting of carbon free radical, anionic radical of carbon alkali metal ion and carbon cationic radical. The copolymer of a conjugated diene could be random, block, graft and taper copolymers of two or more conjugated dienes, or random, block, graft and taper copolymers of at least one conjugated diene monomer and at least one vinyl aromatic hydrocarbon.

Conjugated diene monomer suitable for use in the present invention could be a conjugated diene having carbon atoms from 4 to 12. Representative examples include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and a mixture thereof. Butadiene, isoprene and a mixture of butadiene and isoprene are suitable conjugated diene monomers for use in the present invention.

The suitable styrene-butadiene copolymer used in the present invention is hydrogenated into a styrene-ethylene-butylene-styrene (SEBS) block copolymer. The suitable styrene-isoprene copolymer used in the present invention is hydrogenated into a styrene-ethylene-propylene-styrene (SEPS) block copolymer. The suitable styrene-(butadiene/isoprene) copolymer used in the present invention is hydrogenated into a styrene-ethylene-ethylene-propylene-styrene (SEEPS) block copolymer.

The conjugated diene polymer could have a number average molecular weight of 1000 to 1000000.

When the conjugated diene/vinyl aromatic hydrocarbon copolymer is hydrogenated, a high value thermoplastic elastomer is obtained. Aromatic hydrocarbon monomers suitable for use in the present invention include styrene, tert-butylstyrene, a-methyl styrene, o-methyl styrene, p-methyl styrene, divinyl benzene, 1,1-diphenyl ethylene, vinyl naphthalene, N,N-dimethyl-p-aminoethylstyrene and N,N-diethyl-p-aminoethylstyrene, preferably styrene. Representative examples of conjugated diene/vinyl aromatic hydrocarbon copolymer include (1) butadiene/styrene copolymer, (2) isoprene/styrene copolymer and (3) butadiene/isoprene/styrene copolymer.

In addition, a tertiary amine compound or ether compound could be added to the conjugated diene polymer system in order to increase the vinyl structure content of the conjugated diene. Such compounds suitable for use include general tertiary amine compounds, tetrahydrofuran and diethyl ether.

0.0001 to 50 millimoles of the hydrogenation catalyst composition (a) based on 100 g of the conjugated diene polymer is sufficient. If more than 50 millimoles is used, the hydrogenation result will lose economical efficiency, and the catalyst removal procedures will be more complicated. Preferably, the hydrogenation catalyst composition (a) is present in an amount of 0.002 to 1 millimoles based on 100 g of the conjugated diene polymer.

Preferably, the molar ratio of the hydrogenation catalyst composition (b) to the hydrogenation catalyst composition (a) is 0.1 to 50. If the molar ratio is less than 0.1, the hydrogenation catalyst could not efficiently increase the hydrogenation activity, and thus, hydrogenation stops and the ideal goal could not be achieved. If the molar ratio is higher than 50, the catalyst must be removed and unnecessary secondary reaction easily occurs, which hinders the hydrogenation. Most preferably, the molar ratio of the hydrogenation catalyst composition (b) to the hydrogenation catalyst composition (a) is 2 to 15.

Preferably, the molar ratio of the hydrogenation catalyst composition (c) to the hydrogenation catalyst composition (a) is 0.1 to 50. If the molar ratio is less than 0.1, the catalyst composition (c) could not activate the catalyst composition (a) and the hydrogenation conversion is poor. If the molar ratio is higher than 50, the unnecessary secondary products will rapidly decrease the hydrogenation conversion. Also, the catalyst must be removed, which makes the subsequent procedures more complicated.

The hydrogenation reaction of the present invention could be conducted at a temperature of 0□ to 200□. If the reaction temperature is lower than 0□, the reaction rate is too low and the catalyst composition (a) amount must be increased, impacting economical efficiency. If the reaction temperature is higher than 200□, the catalyst will be deactivated, thus decreasing the catalytic activity. Also, secondary reaction easily occurs, which in turn decomposes the polymer to form gel. Preferably, the hydrogenation temperature is 40□ to 150□.

The hydrogenation could be conducted preferably at a hydrogen pressure of 1 kg/cm$^2$ to 90 kg/cm$^2$. When the hydrogen pressure is less than 1 kg/cm$^2$, the reaction rate may be not obvious. When the hydrogen pressure is higher than 90 kg/cm$^2$, the hydrogenation will rapidly stop. The catalyst amount could be decreased by increasing the hydrogen pressure. In order to decrease the catalyst amount, it is preferable to conduct hydrogenation at higher hydrogen pressure.

According to the present invention, the hydrogenation time could be several seconds to 40 hours. Suitable range could be adjusted by the reaction conditions such as the ratio of the catalysts, hydrogen pressure, and hydrogenation temperature.

According to the present invention, the catalyst composition amount, hydrogen pressure and hydrogenation temperature could be adjusted in order to achieve the desired hydrogenation conversion of double bonds in the conjugated diene polymer. Using the catalyst composition of the present invention to hydrogenate the conjugated diene/vinyl aromatic hydrocarbon copolymer, at least 50%, even at least 90%, of the unsaturated double bonds in the conjugated diene units are hydrogenated. In contrast, lower than 10%, and even lower than 3%, of the aromatic ring (such as benzene ring) double bonds in the vinyl aromatic hydrocarbon units are hydrogenated. That is to say, the catalyst composition of the present invention has relatively good catalytic selectivity. The hydrogenation conversion for the conjugated diene units could be detected by IR spectrum analysis, and the hydrogenation conversion for the aromatic ring double bonds in the vinyl aromatic hydrocarbon units could be detected by UV spectrum analysis, which could be referred to U.S. Pat. No. 4,501,857.

The polymer solution obtained from hydrogenation using the hydrogenation catalyst composition of the present invention could be coagulated by adding a polar solvent. Such polar solvent is a poor solvent for the hydrogenated polymer, such as methanol or acetone. Or, alternatively, the hydrogenated polymer solution could be poured into hot water, stirred, and then distilled for separation. Or, the hydrogenated polymer solution could be directly heated to evaporate the solvent for separation.

According to the present invention, the conjugated diene polymer could be successfully hydrogenated using a small amount of a hydrogenation catalyst composition with relatively high activity. Since the catalyst composition concentration is very low, most catalyst is separated from the polymer or decomposes during the polymer separation procedure. Therefore, there is no need to wash or remove the catalyst from the hydrogenated polymer, greatly enhancing economic efficiency.

A feature of the catalyst composition of the present invention is that the catalyst composition (b) could combine with other catalysts to stabilize other catalysts and enhance the catalytic activity thereof. Therefore, when the catalyst composition of the present invention is added to the conjugated diene polymer, it could be stored for a period of time in the inert gas atmosphere, generally more than 30 minutes, still maintaining good catalytic activity and reproducibility. Another feature is that the catalyst composition of the present invention has high hydrogenation activity at a higher temperature. In addition, the catalyst composition of the present invention will not lose the catalytic activity due to high hydrogenation reaction heat. Therefore, it is very suitable for commercial mass production.

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; is not intended to be exhaustive or to be limited to the precise form disclosed.

EXAMPLE 1

Preparation of SBS Copolymer 5400 g of cyclohexane, 7.4 millimoles of n-butyl lithium and 252 millimoles of tetrahydrofuran (THF) were charged in 10 L of a heater equipped with a stirrer. Then, 96 g of styrene was added and the polymerization was conducted at 45° C. Then, 400 g of butadiene and 96 g of styrene were added to the reaction system and the reaction mixture was further polymerized to an SBS (styrene-butadiene-styrene) tri-block copolymer (solid content=9.7%, Mw=230,000).

EXAMPLE 2

1000 g of the polymer solution of SBS tri-block copolymer prepared from Example 1 was transferred to a pressure-resistant hydrogenation vessel and maintained in the nitrogen atmosphere. 0.11 millimoles of triethyl phosphate was dissolved in 10 ml of cyclohexane at room temperature, 0.11 millimoles of triethyl phosphate and 0.16 millimoles of n-butyl lithium were mixed in 10 ml of cyclohexane in a glove box, and 0.055 millimoles of bis(cyclopentadienyl)titanium dichloride and 0.33 millimoles of triisobutyl aluminum were mixed in 20 ml of cyclohexane. The above solutions were added to the SBS copolymer. Hydrogen was fed in under a pressure of 25 kg/cm$^2$ to undergo hydrogenation at 80° C.

FIG. 1 shows IR spectra of the SBS copolymer before and after hydrogenation. It could be seen that in the spectrum of the SBS tri-block copolymer before hydrogenation, the trans double bond is present at the wavelength peaks 968 cm$^{-1}$ and 995 cm$^{-1}$ and the 1,2-vinyl group double bond is present at the wavelength peak 912 cm$^{-1}$. After 3 hour of hydrogenation, it could be seen that the above peaks disappear obviously, the hydrogenation conversion (the hydrogenation conversion of the unsaturated double bond of the butadiene unit) was measured to 98%. The hydrogenation data are summarized in Table 1.

EXAMPLE 3

1000 g of the polymer solution of SBS tri-block copolymer prepared from Example 1 was transferred to a pressure-resistant hydrogenation vessel and maintained in the nitrogen atmosphere. 0.11 millimoles of triethyl phosphate was dissolved in 10 ml of cyclohexane at room temperature, 0.055 millimoles of bis(cyclopentadienyl)titanium dichloride was dissolved in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 80° C. The butadiene hydrogenation conversion was measured to reach 95% after 3 hours. The hydrogenation data are summarized in Table 1.

EXAMPLE 4

1000 g of the polymer solution of SBS tri-block copolymer prepared from Example 1 was transferred to a pressure-resistant hydrogenation vessel and maintained in the nitrogen atmosphere. 0.11 millimoles of triethyl phosphate was dissolved in 10 ml of cyclohexane at room temperature, 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 80° C. The butadiene hydrogenation conversion was measured to reach 95% after 3 hours. The hydrogenation data are summarized in Table 1.

EXAMPLE 5

The same procedures described in Example 3 were repeated except that triethyl phosphate was changed to 0.165 millimoles of dimethyl methylphosphonate dissolved in 10 ml of cyclohexane. 0.055 millimoles of bis(cyclopentadienyl) titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 80° C. The butadiene hydrogenation conversion was measured to reach 97% after 3 hours. The hydrogenation data are summarized in Table 1.

EXAMPLE 6

The same procedures described in Example 3 were repeated except that triethyl phosphate was changed to 0.2 millimoles of methyl diethoxyphosphonate dissolved in 10 ml of cyclohexane. 0.055 millimoles of bis(cyclopentadienyl) titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 80° C. The butadiene hydrogenation conversion was measured to reach 95% after 2.8 hours. The hydrogenation data are summarized in Table 1.

EXAMPLE 7

1000 g of the polymer solution of SBS tri-block copolymer prepared from Example 1 was transferred to a pressure-resistant hydrogenation vessel and maintained in the nitrogen atmosphere. As the steps of Example 2, the catalyst compositions were added to the SBS copolymer. After 48 hours, hydrogen was fed in under a pressure of 25 kg/cm$^2$ to undergo hydrogenation at 80° C. The butadiene hydrogenation conversion was measured to reach 95% after 3 hours. The hydrogenation data are summarized in Table 1.

EXAMPLE 8

The same procedures described in Example 3 were repeated except that changed the hydrogenation temperature to 100° C. The butadiene hydrogenation conversion was measured to reach 96% after 1.6 hours. The hydrogenation data are summarized in Table 1.

The below are several comparative examples used for comparing the embodiments of the present invention and describing the features and advantages of the catalyst compositions. It is worth to note that the catalyst compositions used in the comparative examples do not include the catalyst composition (b) existing in the present invention.

COMPARATIVE EXAMPLE 1

The same procedures described in Example 3 were repeated except that triethyl phosphate was not added. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 80° C.

Figure 2:
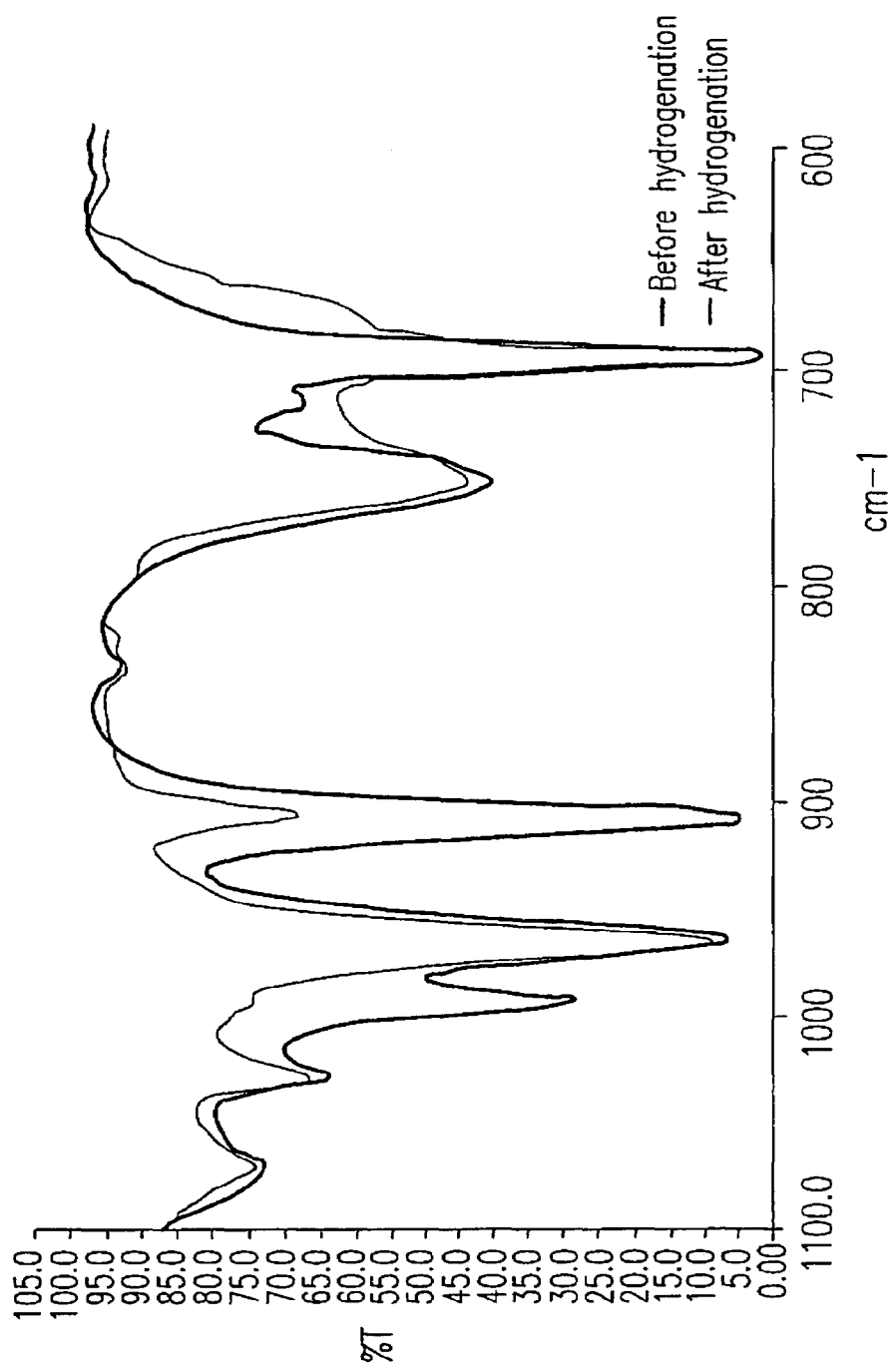
FIG. 2 is the IR spectrum schematically showing the SBS copolymer of comparative Example 1 before and after hydrogenation.

FIG. 2 shows IR spectra of the SBS copolymer before and after hydrogenation. It could be seen that in the spectrum of the SBS tri-block copolymer before hydrogenation, the trans double bond is present at the wavelength peaks 968 cm$^{-1}$ and 995 cm$^{-1}$ and the 1,2-vinyl group double bond is present at the wavelength peak 912 cm$^{-1}$. After 1 hour of hydrogenation, it could be seen that the 995 cm$^{-1}$ and 912 cm$^{-1}$ peaks have decreased absorption, but the absorption of 968 cm$^{-1}$ peak has almost no change. At that time, the butadiene hydrogenation conversion was measured to 23%. The hydrogenation data are summarized in Table 1.

COMPARATIVE EXAMPLE 2

1000 g of the polymer solution of SBS tri-block copolymer prepared from Example 1 was transferred to a pressure-resistant hydrogenation vessel. The SBS copolymer was fed with hydrogen and stirred for 30 minutes. The same procedures described in Example 3 were repeated except that triethyl phosphate was changed to 0.22 millimoles of n-butyl lithium. 0.055 millimoles of bis(cyclopentadienyl)titanium dichloride was dispersed in 10 ml of cyclohexane, and 0.44 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 80° C. The butadiene hydrogenation conversion was measured to reach 15% after 30 minutes and reach 24% after 1 hour.

TABLE 1

| Example | Residual trans double bonds (%) | Residual 1,2-vinyl double bonds (%) | butadiene hydrogenation conversion (%) | benzene ring hydrogenation conversion (%) |
|---|---|---|---|---|
| Example 2 | 2.6 | 0.3 | 97 | <1 |
| Example 3 | 2.1 | 0.2 | 95 | <1 |
| Example 4 | 2.3 | 0.3 | 95 | <1 |
| Example 5 | 1.8 | 0.4 | 97 | <1 |
| Example 6 | 2.5 | 0.3 | 95 | <1 |
| Example 7 | 2.1 | 0.4 | 95 | <1 |
| Example 8 | 1.9 | 0.3 | 96 | <1 |
| Comp. Ex. 1 | 75.5 | 1.5 | 23 | <1 |
| Comp. Ex. 2 | 74.4 | 1.6 | 24 | <1 |

From Table 1, in hydrogenating a conjugated diene polymer using the catalyst compositions of the present invention, the percentages of the residual trans double bonds and the residual 1,2-vinyl double bonds are lower than 5% and the percentage of the 1,3-butadiene hydrogenation conversion is higher than 95%. On the other hand, the percentages of the residual trans double bonds and the residual 1,2-vinyl double bonds are much higher since the catalyst compositions of the comparative examples 1 and 2 do not include the catalyst composition (b), and the percentage of the 1,3-butadiene hydrogenation conversion thereof is lower than 25%.

Accordingly, the present invention provides a catalyst composition for successful hydrogenation of a conjugated diene polymer using a small amount of a hydrogenation catalyst composition with relatively high activity. The catalyst composition could be stored for a long period of time and maintains good catalytic activity stability and reproducibility, which greatly enhances economical efficiency. Moreover, the method for hydrogenating a polymer having a conjugated diene could be performed over a wide range of temperatures since the catalyst composition has a higher hydrogenating activity over a wide range of temperatures. In addition, the catalyst composition of the present invention will not lose the catalytic activity for high hydrogenation reaction heat, and is therefore very suitable for the operation requirements of industrial continuous production.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A catalyst composition for hydrogenating a polymer having a conjugated diene, comprising:
    (a) a first composition having one of a titanium compound of a formula (I):

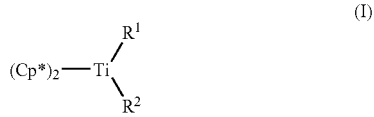

(I)

wherein:
R¹ and R² are ones selected from the group consisting of hydrogen, halogen, $C_1$~$C_8$ alkyl, $C_1$~$C_8$ alkoxy, $C_6$~$C_{12}$ cycloalkyl, phenyl, phenoxy, $C_7$~$C_{10}$ arylalkoxy, $C_7$~$C_{10}$ arylalkyl, carboxy, —$CH_2P(phenyl)_2$, —$CH_2Si(C_1$~$C_5$ alkyl$)_3$ and —$P(phenyl)_2$; and
Cp* is one selected from the group consisting of cyclopendienyl, fluorenyl, indenyl and derivatives thereof,
(b) a second composition having one of a first compound of a formula (II) and a second compound of a formula (III):

(II)

(III)

wherein R is one selected from the group consisting of $C_1$~$C_{12}$ alkyl, $C_3$~$C_{12}$ cycloalkyl, aryl, and alkyl aryl, M is one selected from the group consisting of $C_1$~$C_{12}$ alkyl, $C_1$~$C_{12}$ alkoxy, aryl, alkyl aryl, phenoxy and hydroxyl and n=1 to 3; and
(c) a third composition having an alkylaluminum compound of a formula (IV):

(IV)

wherein the R⁴, R⁵ and R⁶ are ones selected from the group consisting of $C_1$~$C_{12}$ alkyl, $C_6$~$C_{12}$ aryl, hydrogen and halogen.

2. The catalyst composition as claimed in claim 1, wherein the first composition is one selected from the group consisting of a bis(cyclopentadienyl)titanium halide, bis(cyclopentadienyl)titanium, bifluorenyl titanium halide, biindenyl titanium halide, bifluorenyl titanium, biindenyl titanium and a derivative thereof.

3. The catalyst composition as claimed in claim 1, wherein the second composition is a compound of the formula (II) and R is one selected from the group of $C_1$~$C_{12}$ alkyl, $C_1$~$C_{12}$ cycloalkyl, aryl and alkyl aryl, where n=3.

4. The catalyst composition as claimed in claim 1, wherein the second composition is a compound of the formula (II), R is one selected from the group consisting of $C_1$~$C_{12}$ alkyl, and M is one selected from the group consisting of $C_1$~$C_{12}$ alkyl, alkoxy, aryl, alkyl aryl, phenoxy and hydroxyl, where n=2.

5. The catalyst composition as claimed in claim 1, wherein the second composition is a compound of the formula (II), R is one of aryl and alkyl aryl, and M is one selected from the group consisting of $C_1$~$C_{12}$ alkyl, alkoxy, aryl, alkyl aryl, phenoxy and hydroxyl.

6. The catalyst composition as claimed in claim 1, wherein the second composition is a compound of the formula (III) and R is one selected from the group consisting of $C_1$~$C_{12}$ alkyl, $C_3$~$C_{12}$ cycloalkyl, aryl and alkyl aryl, where n=3.

7. The catalyst composition as claimed in claim 1, wherein the second composition is a compound of the formula (III), R is one selected from the group consisting of $C_1$~$C_{12}$ alkyl, and M is one selected from the group consisting of $C_1$~$C_{12}$ alkyl, alkoxy, aryl, alkyl aryl and phenoxy.

8. The catalyst composition as claimed in claim 1, wherein the third composition is one selected from the group consisting of trimethyl aluminum, triethyl aluminum, tri-n-propyl aluminum, triisopropyl aluminum, tributyl aluminum, tri(sec-butyl) aluminum, tri(isobutyl)aluminum, tri(n-pentyl) aluminum, tri(isopentyl)aluminum, tri(n-hexyl) aluminum, tri(isohexyl)aluminum, tri(1-methylpentyl)aluminum, tri(2,5-dimethyloctyl) aluminum, tri(2,6-dimethyloctyl)aluminum, triphenyl aluminum, diethyl aluminum chloride, ethyl aluminum dichloride, tripropyl aluminum chloride, dibutyl aluminum chloride, diisobutyl aluminum chloride, butyl aluminum dichloride and compositions thereof.

9. The catalyst composition as claimed in claim 1, wherein polymer is obtained through one of an anionic polymerization, a free radical polymerization, a coordination polymerization and a cationic polymerization.

10. The catalyst composition as claimed in claim 1, wherein the first composition, the second composition and the third composition are respectively added into a solution of the polymer at the same time.

11. The catalyst composition as claimed in claim 1, wherein the first composition, the second composition and the third composition are respectively added into a solution of the polymer at random.

12. The catalyst composition as claimed in claim 1, wherein the content of the first composition is ranged from 0.001 to 50 millimoles per 100 g of the polymer.

13. The catalyst composition as claimed in claim 1, wherein a molar ratio of the second composition to the first composition is from 0.1 to 50.

14. The catalyst composition as claimed in claim 1, wherein a molar ratio of the third composition to the first composition is from 0.1 to 50.

15. The catalyst composition as claimed in claim 1, wherein one unit of the polymer has a molecular weight of 1,000 to 1,000,000.

16. The catalyst composition as claimed in claim 1, wherein the hydrogenation catalyst composition is applied to one of a conjugated diene homopolymer and a copolymer of a vinyl aromatic hydrocarbon and the conjugated diene.

17. The catalyst composition as claimed in claim 16, wherein the copolymer is one selected from the group consisting of styrene-butadiene copolymer, styrene-isoprene copolymer and styrene-(butadiene/isoprene) copolymer.

18. The catalyst composition as claimed in claim 17, an arrangement of the copolymer is one selected from the group consisting of a block arrangement, a random arrangement and a taper arrangement.

19. The catalyst composition as claimed in claim 17, the styrene-butadiene copolymer is hydrogenated into a styrene-ethylene-butylene-styrene (SEBS) copolymer.

20. The catalyst composition as claimed in claim 17, the styrene-isoprene copolymer is hydrogenated into a styrene-ethylene-propylene-styrene (SEPS) copolymer.

21. The catalyst composition as claimed in claim 17, the styrene-(butadiene/isoprene) copolymer is hydrogenated into a styrene-ethylene-ethylene-propylene-styrene (SEEPS) copolymer.

22. A method for hydrogenating a polymer having a conjugated diene, wherein the polymer is one of a conjugated diene homopolymer and a conjugated diene copolymer, comprising steps of:
dissolving the polymer into an inert organic solvent; and
hydrogenating the dissolved polymer in a presence of a catalyst composition comprising the first, second and third composition as claimed in claim 1, so as to selectively hydrogenate an unsaturated double bond in the polymer.

23. The method as claimed in claim 22, wherein the step of hydrogenating is performed at a temperature ranged from 0° C. to 200° C. and at a hydrogen pressure ranged from 1 to 90 $kg/cm^2$.

24. The method as claimed in claim 22, wherein at least 50% of the unsaturated double bond in the polymer are hydrogenated.

25. The method as claimed in claim 22, wherein a percentage of an aromatic ring double bond in the vinyl aromatic hydrocarbon being hydrogenated is under 10%.

* * * * *